ize. Patented Aug. 10, 1943

UNITED STATES PATENT OFFICE 2,326,523

PREPARATION OF GEL CATALYST

Gerald C. Connolly and Rhea N. Watts, Baton Rouge, La., assignors to Standard Oil Development Company, a corporation of Delaware No Drawing. Application June 24, 1939, Serial No. 281,054

1 Claim. (Cl. 252—259.2)

This invention relates to a method of preparing catalysts and particularly to a method of preparing molded gel catalysts.

While the invention in some of its broader phases may have a more general application it is particularly adapted for the preparation of molded gel catalyst in which the gel is combined or impregnated with an active catalyst component before the molding operation.

In many types of catalytic operations it is desirable to employ molded catalyst units of uniform size. Such molded catalyst units are particularly desirable for example in catalytic operations in which a stationary bed or mass of catalyst is supported within the reaction chamber and the reactants are passed through the mass. In such operation the provision of a catalyst unit of uniform size insures a more uniform distribution of the reactants throughout the mass and reduces the resistance of the mass to the flow of the reactants therethrough.

Experience has shown that catalysts having a composition which will give the highest level of efficiency for bringing about a given reaction may not have the consistency which will give desired mechanical strength for the intended service. In view of this it is necessary in some cases to add binding or reinforcing agents to the catalyst mass in order to produce a molded product of required strength. The addition of such extraneous materials may, however, reduce the effectiveness of the catalyst for bringing about the desired reaction.

For example, synthetic gels consisting principally of silica and alumina when properly prepared form exceptionally good catalysts for cracking oils. These gels as such, however, are not readily molded into units of required mechanical strength.

One of the objects of the present invention is to provide an improved method of preparing molded synthetic catalyst which will not be subjected to the above mentioned objections.

A more specific object of the invention is to provide an improved method of preparing molded synthetic gels impregnated with other catalytic agents.

Other more detail objects of the present invention will be apparent from the detailed description appearing hereinafter.

In accordance with the present invention a hydrogel such as a silica hydrogel is first prepared according to common procedure. For example, a solution of sodium silicate and an acid may be combined by mixing the two streams simultaneously while thoroughly agitating the mixture. The mixture is maintained slightly acid throughout the mixing period. When conditions are properly controlled, a clear hydrosol of silica forms which upon standing, sets into a firm hydrogel. Under less carefully controlled conditions a portion of the silica may precipitate in gelatinous form. While it is preferred to carefully regulate the conditions so as to form a clear hydrosol, it will be understood that the invention does not preclude the presence of such a gelatinous precipitate.

The hydrosol after being allowed to set into a firm hydrogel and until syneresis has been fully developed is then broken into lumps and thoroughly washed until substantially free of reaction salts.

The resulting washed hydrogel is then soaked in a salt solution of another catalytic component, until thoroughly impregnated. The concentration of solution may be adjusted to produce a resulting product having a desired percentage of the additional catalyst component.

The impregnated product after draining is subjected to a thorough kneading treatment in any suitable equipment. During the kneading operation the product gradually changes from a jelly consistency into a plastic mixture having tacky characteristics making it unsuitable for immediate molding. Upon standing, however, the tackiness disappears so that the product can be readily formed into desired shapes such as by extrusion. The texture of the plastic material can be regulated within limits and the length of aging period between the kneading and molding steps may be reduced by incorporating a small amount, of the order of 10% or less of dry gel powder during the kneading process.

After molding, the material is slowly dried at a low temperature and then heat treated to activate the catalyst. For example, after drying at a temperature below 212° F. the product may be slowly heated to 800° F. and maintained at said temperature for a period of 3 or 4 hours. During the drying operation the molded products shrinks to a substantial degree. As a result the product has a relatively high density and mechanical strength.

By allowing the kneaded product to age prior to the extrusion or by addition of the minor amount of dry gel fines thereto, we are able to produce a resulting product which has a density similar to the density of granular products particles of gel of the same mesh and which has the same order of activity of such granular gels.

As an aid to a better understanding of the invention the following examples may be helpful. It will be understood however, that the examples are illustrative rather than limitive.

Example I

A silica hydrogel was first formed in the conventional manner. The hydrogel after being washed free of impurities was impregnated with a solution of aluminum nitrate of a concentration sufficient to produce a product containing about 10% aluminum oxide. The resulting product after draining was kneaded in a Simpson kneading mill for a period of about ½ to 1 hour. During the kneading operation about 10% (on a water free basis) of the dry silica gel impregnated with alumina was added or, in other words about one pound of dry gel to a hundred pounds of dry gel containing 90% water. After the kneading treatment the product was allowed to stand for three hours at room temperature. The product was then extruded through a ¼" diameter die and cut into lengths. The extruded product was slowly dried at a temperature of about 200° F. for 16 to 24 hours and then gradually heated to 800 F. to decompose the aluminum nitrate to the oxide. The extruded product was found to have a density of .64 and a side strength of 60 pounds.

The activity of the product for catalytic cracking of hydrocarbon oil was determined by passing an East Texas gas oil of 33.8 A. P. I. gravity in contact with the catalyst at a temperature of 850° F. at a feed rate of .6 V/V/hr. for two hour periods. The amount of liquid distillate boiling below 400° F. amounted to 53%.

Example II

For comparative purposes an impregnated hydrogel prepared as in Example I was dried and decomposed without kneading. The product was then mixed with sufficient silica hydrogel to form an extrudable mixture. The resulting product was then extruded as in Example I. The resulting product had a density of .48 and a side strength of 2 pounds.

This product when tested for cracking activity under the same conditions specified in Example I, resulted in the production of 44.5% of liquid distillate boiling below 400° F.

Example III

An impregnated silica hydrogel prepared as in Example I was dried decomposed and formed into pills of about 5 millimeters in diameter and 5 millimeters in length. The pills thus formed had a density of .64 and side strength of 8 pounds. This product yielded 49.5% distillate below 400° F. when tested as specified in Example I.

It will be noted that the products formed according to the present invention are not only more active as catalysts but have a mechanical strength of a much higher order than products formed according to other methods.

While we have described the preparation of silica gel impregnated with alumina, it will be understood that the invention has application to other types of gels and to gels impregnated with other materials.

Having described the specific embodiment of the invention it will be understood that it embraces other variations and modifications that come within the spirit and scope thereof.

We claim:

A method of preparing a synthetic silica gel containing an active metallic oxide other than silica which comprises first forming a silica hydrogel, thereafter soaking the hydrogel so formed with a solution containing a soluble salt of said active metal capable of being converted into the oxide to thereby impregnate said hydrogel with salt solution, thereafter kneading the impregnated gel for a period sufficient to convert said impregnated gel into a plastic mass having tacky characteristics, thereafter mixing about 10% of finely-divided, dry silica gel to said plastic mixture, then allowing the impregnated gel to stand for a period of at least three hours and until said impregnated gel has partially set, moulding the partially set product into units of predetermined shape and thereafter drying and activating the moulded product.

GERALD C. CONNOLLY.
RHEA N. WATTS.